(12) United States Patent
Hwang et al.

(10) Patent No.: US 8,327,438 B2
(45) Date of Patent: Dec. 4, 2012

(54) SYSTEM FOR EXECUTING PROGRAM USING VIRTUAL MACHINE MONITOR AND METHOD OF CONTROLLING THE SYSTEM

(75) Inventors: Joo-Young Hwang, Suwon-si (KR); Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1196 days.

(21) Appl. No.: 12/127,901

(22) Filed: May 28, 2008

(65) Prior Publication Data
US 2009/0165133 A1 Jun. 25, 2009

(30) Foreign Application Priority Data

Dec. 24, 2007 (KR) .......................... 10-2007-0136612

(51) Int. Cl.
*H04L 29/06* (2006.01)
(52) U.S. Cl. ............... 726/22; 726/15; 726/23; 713/187
(58) Field of Classification Search ....................... 726/22
See application file for complete search history.

(56) References Cited

U.S. PATENT DOCUMENTS

| | | | | |
|---|---|---|---|---|
| 7,581,209 | B2 * | 8/2009 | Filho .............................. | 717/129 |
| 7,774,620 | B1 * | 8/2010 | Stott et al. ...................... | 713/193 |
| 7,827,550 | B2 * | 11/2010 | Daruwala et al. ................. | 718/1 |
| 2008/0005794 | A1 * | 1/2008 | Inoue et al. ...................... | 726/22 |
| 2008/0127336 | A1 * | 5/2008 | Sun et al. ......................... | 726/22 |
| 2008/0234998 | A1 * | 9/2008 | Cohen et al. .................... | 703/24 |

FOREIGN PATENT DOCUMENTS

| | | |
|---|---|---|
| EP | 1643409 A2 | 4/2006 |
| EP | 1811387 A1 * | 7/2007 |
| JP | 2003-256234 A | 9/2003 |
| KR | 10-2006-0093265 A | 8/2006 |
| WO | 02/073379 A2 | 9/2002 |

OTHER PUBLICATIONS

Qian Lu et al. "An In-Vm Measuring Framework for Increasing Virtual Machine Security in Clouds." Shanghai Jiao Tong University. Co-published by IEEE Computer and Reliability Societies (Nov./Dec. 2010.*

* cited by examiner

*Primary Examiner* — Taghi Arani
*Assistant Examiner* — Narciso Victoria
(74) *Attorney, Agent, or Firm* — Sughrue Mion, PLLC

(57) ABSTRACT

A system for executing a program using a virtual machine monitor and a method of controlling the system are provided. The system includes a virtual machine monitor which divides an operating system (OS) into at least one root domain and a plurality of domains having different trust levels, and a trust-management module which is included in the at least one root domain and which periodically measures the trust level of an application program currently being executed in the plurality of domains. The virtual machine monitor executes the application program in one of the domains based on the trust level of the application program.

15 Claims, 6 Drawing Sheets

SYSTEM FOR EXECUTING PROGRAM USING VIRTUAL MACHINE MONITOR AND METHOD OF CONTROLLING THE SYSTEM

CROSS-REFERENCE TO RELATED APPLICATION

This application claims priority from Korean Patent Application No. 10-2007-0136612 filed on Dec. 24, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to controlling program execution, and more particularly to controlling program execution based on virtual machine monitor.

2. Description of the Related Art

In general, security programs such as anti-virus software (AVS) or intrusion detection systems (IDSs) may exist in the area of operating systems (OSs) and application programs, and may perform virus check and removal on OSs and application programs.

Security programs or IDSs may also exist in a virtual machine monitor and may perform virus check or removal in a virtual machine monitor. A virtual machine monitor exists between a hardware device and an OS and virtualizes a hardware device so that a plurality of OSs can operate at the same time. A virtual machine monitor may replace firmware or operate between firmware and an OS. Examples of a typical hardware device include input/output (I/O) ports, memories and other storage devices. Due to a virtual machine monitor, all data can be transferred from an I/O port, a memory and another storage device to an OS or an application program. During this process, a security program present in a virtual machine monitor may perform virus check and removal on data transferred between a hardware device and an OS or an application program.

Conventionally, when an OS is infected, and when a security program or an IDS operates in the infected OS along with an application program, the security program or the IDS is highly likely to be infected as well or the virus check is accidentally skipped.

In addition, even when present in a virtual machine monitor, a security program or an IDS can simply perform short-term monitoring to determine whether an application program is malicious, thus lowering the precision of malware detection and causing false alarms such as false positives and false negatives.

Moreover, malicious application programs that can deceive security programs or IDSs by disguising themselves as legitimate programs have become widespread. It is therefore necessary to avoid false positives and false negatives in malware detection.

SUMMARY OF THE INVENTION

The present invention provides a system for executing a program using a virtual machine monitor and a method of controlling the system in which the stability of a system can be improved by periodically measuring the trust level of an application program.

However, the aspects of the present invention are not restricted to the ones set forth herein. The above and other aspects of the present invention will become apparent to one of ordinary skill in the art to which the present invention pertains by referencing detailed description of the present invention given below.

According to an aspect of the present invention, there is provided a system for executing a program using a virtual machine monitor, the system including a virtual machine monitor which divides an OS into at least one root domain and a plurality of domains having different trust levels; and a trust-management module which is included in the root domain and periodically measures the trust level of an application program currently being executed in the OS, wherein the virtual machine monitor executes the application program in one of the domains in consideration of the trust level of the application program.

According to another aspect of the present invention, there is provided a method of controlling a system for executing a program using a virtual machine monitor, the method including dividing an OS into at least a root domain and a plurality of domains having different trust levels by using a virtual machine monitor; enabling the root domain to periodically measure the trust level of an application program currently being executed in the OS; and executing the application program in one of the domains according to the trust level of the application program.

BRIEF DESCRIPTION OF THE DRAWINGS

The above and other features and advantages of the present invention will become apparent by describing in detail exemplary embodiments thereof with reference to the attached drawings in which.

DETAILED DESCRIPTION OF EXEMPLARY EMBODIMENTS OF THE INVENTION

Figure 1:
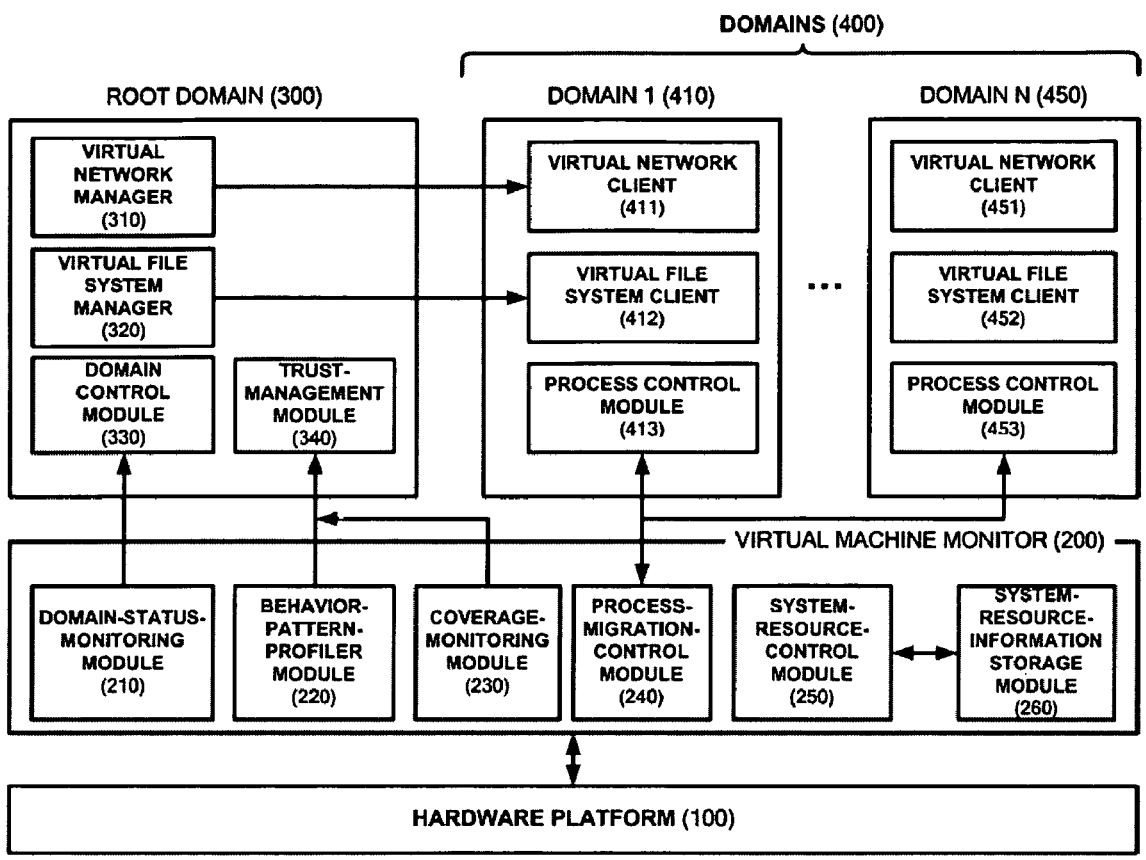
FIG. 1 illustrates a block diagram of a system for executing a program using a virtual machine monitor, according to an exemplary embodiment of the present invention.

The present invention will now be described more fully with reference to the accompanying drawings, in which exemplary embodiments of the invention are shown.

The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

A system for executing a program using a virtual machine monitor, according to an exemplary embodiment of the present invention, and a method of controlling the system will hereinafter be described in detail with reference to the accompanying drawings.

FIG. 1 illustrates a block diagram of a system for executing a program using a virtual machine monitor, according to an exemplary embodiment of the present invention. Referring to FIG. 1, the system includes a hardware platform 100, a virtual machine monitor 200, a root domain 300 and a plurality of first through N-th domains 410 through 450. The first through N-th domains may be collectively referred to as the domains 400.

The hardware platform 100 may be a hardware device including a central processing unit (CPU), a memory, an I/O port and a storage device.

The virtual machine monitor 200 exists between the hardware platform 100 and an OS. The virtual machine monitor 200 virtualizes a single hardware device so that a plurality of OSs can operate at the same time. The term "OS", as used herein, may indicate an individual OS such as Windows or Linux or more than one OS. An OS may not necessarily use a single resource physically but access the resource through a virtualization layer by performing virtualization. That is, an OS may use a single physical system resource as several virtual system resources.

The virtual machine monitor 200 may divide an OS into at least one root domain 300 and a plurality of domains 400 having different trust levels.

The root domain 300 may include a trust-management module 340. The trust-management module 340 periodically measures and adjusts the trust levels of application programs executed in the domains 400, and this will be described later in further detail.

The root domain 300 may also include a domain control module 330. The domain control module 330 determines the status of each of the domains 400 with the aid of a domain-status-monitoring module 210 of the virtual machine monitor 200. For example, if there is an abnormal domain in the domains 400, the domain control module 330 may request the trust-management module 340 to demote the trust level of an application program currently being executed in the abnormal domain. Then, a process-migration-control module 240 of the virtual machine monitor 200 may migrate a process of the application program currently being executed in the abnormal domain with the aid of a process control module of the abnormal domain.

The first through N-th domains 410 through 450 may include process control modules 413 through 453, respectively. The process control module 413 through 453 may freeze or restore the status of a process of an application program upon receiving a request for the migration of a process of an application program from the process-migration-control module 240 of the virtual machine monitor 200, and this will be described later in further detail.

The root domain 300 may also include a virtual network manager 310 and a virtual file system manager 320. The first through N-th domains 410 through 450 may include virtual network clients 411 through 451, respectively, and virtual file system clients 412 through 452, respectively. The virtual network clients 411 through 451 correspond to the virtual network manager 310, and the virtual file system clients 412 through 452 correspond to the virtual file system manager 320.

The virtual file system manager 320 provides all the domains 400 with a volume view of a single virtual file system and may thus maintain a process of an application program to be accessible even after being migrated between the domains 400. That is, the root domain 300 manages the volume of a virtual file system and enables the virtual file system clients 412 through 452 to access the volume of the virtual file system through the root domain 300. The virtual file system manager 320 may not allow the modification of execution binary code of an application program because, once execution binary code of an application program is modified, the trust level of the application program is no longer valid. In addition, the virtual machine monitor 200 may disallow the execution of an application program if the application program does not have execution binary code.

Referring to FIG. 1, the virtual machine monitor 200 includes the domain-status-monitoring module 210, a behavior-pattern-profiler module 220, a coverage-monitoring module 230, the process-migration-control module 240, a system-resource-control module 250 and a system-resource-information storage module 260.

The domain-status-monitoring module 210 monitors the status of each of the domains 400. If there is an abnormal domain or a domain that has stopped operating for a long time, the domain-status-monitoring module 210 transmits information regarding the abnormal domain or the domain that has stopped operating to the domain control module 330 of the root domain 300.

The behavior-pattern-profiler module 220 analyzes the pattern of runtime behavior of an application program.

The coverage-monitoring module 230 determines the coverage of binary code of an application program.

The process-migration-control module 240 may migrate a process of an application program to a domain that is compatible with the trust level of the application program, and particularly, to a domain whose trust range includes the trust level of the application program.

The system-resource-control module 250 may allocate system resources to each of the domains 400 according to the trust levels of each of the domains 400. The system-resource-control module 250 may control the access of an application program to system resource according to the trust level of the application program.

The system-resource-information storage module 260 may store system resource information regarding system resources allocated to each of the domains 400.

A method of controlling the system illustrated in FIG. 1 will hereinafter be described in detail.

Figure 2:
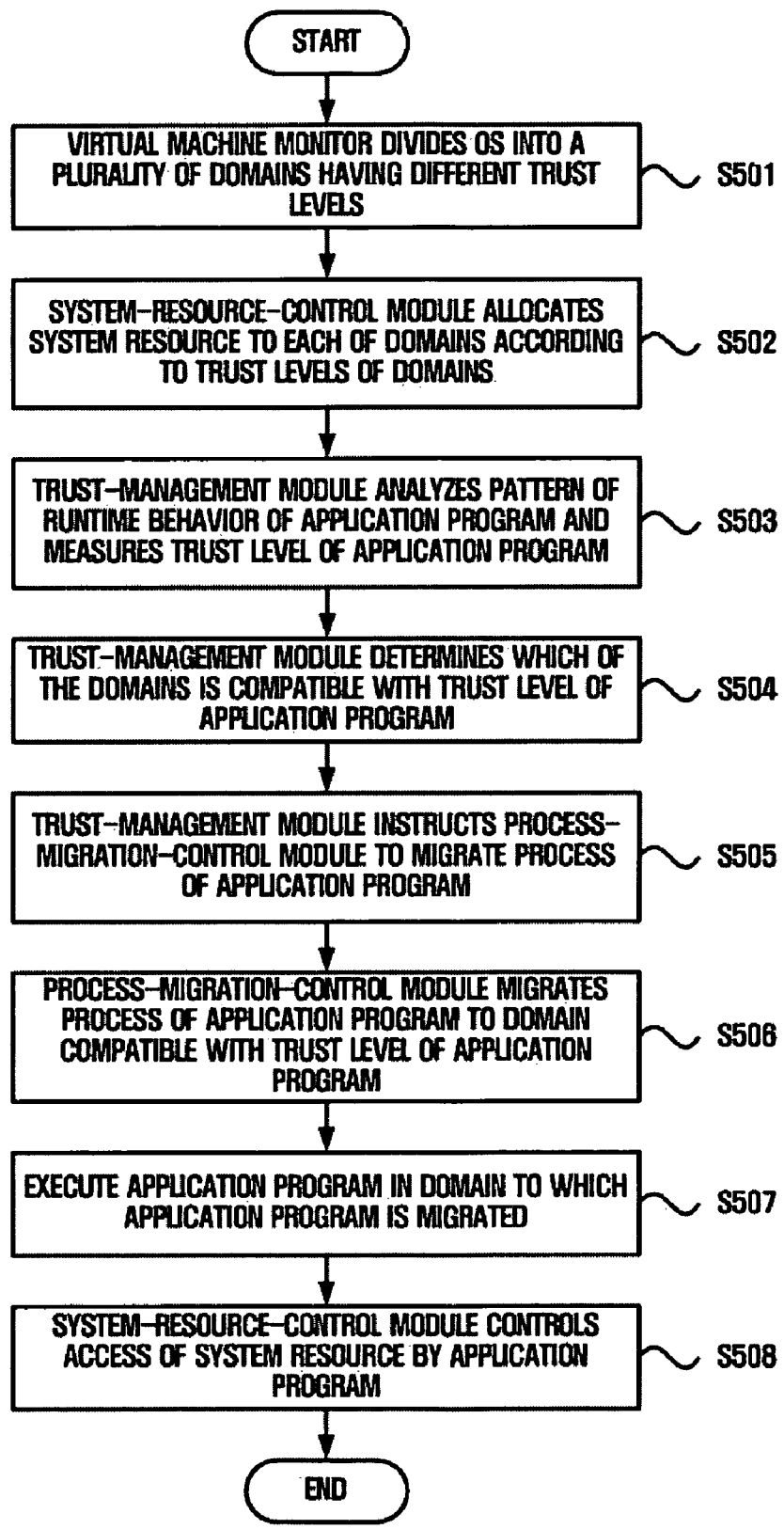
FIG. 2 illustrates a flowchart of the execution of an application program according to the level of trust of the application program by the system illustrated in FIG. 1.

FIG. 2 illustrates a flowchart of the execution of an application program according to the trust level of the application program by the system illustrated in FIG. 1. Referring to FIG. 2, the virtual machine monitor 200 divides an OS into at least one root domain 300 and a plurality of domains 400 having different trust levels (S501).

Figure 3:
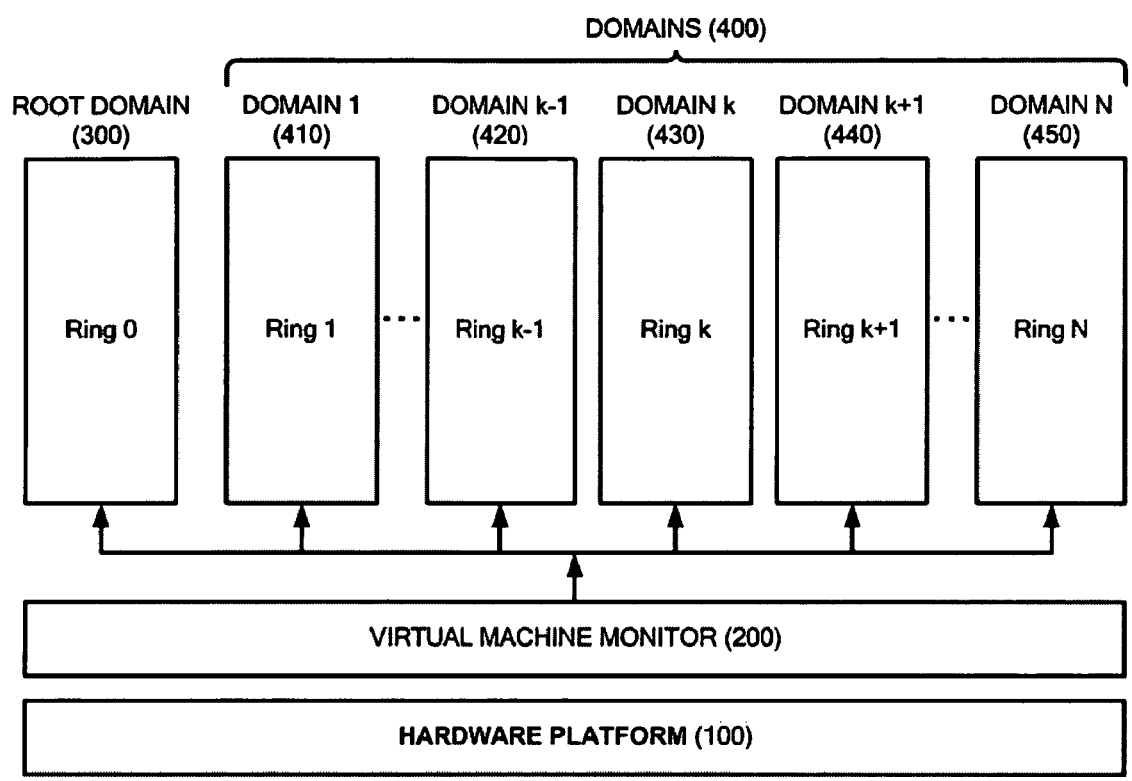
FIG. 3 illustrates a block diagram for explaining the division of an OS into a plurality of domains including one root domain by the virtual machine monitor illustrated in FIG. 1.

FIG. 3 illustrates a block diagram for explaining the division of an OS into a root domain and a plurality of domains by the virtual machine monitor 200.

The root domain 300 is the domain with the highest trust level and has ring 0. That is, the root domain 300 is allowed to access nearly all hardware components and is granted the largest amount of system resource. Binary code and data necessary for executing application programs may be stored in the root domain 300.

The domains 400 may be differentiated from the root domain 300 by their trust levels. For example, referring to FIG. 1, an OS may be divided into a root domain 300 and N domains, i.e., first through N-th domains 410 through 450. The first through N-th domains 410 through 450 have different system-use rights. For example, the first through N-th domains 410 through 450 have ring 1 through ring N, respectively.

The virtual machine monitor 200 provides a virtual machine interface to each of the domains 400 in connection with the hardware platform 100. The virtual machine monitor 200 isolates and protects the address spaces between the domains 400. Each of the domains 400 may access the hardware platform 100 by calling an access service from the virtual machine monitor 200, and this process is referred to as hypercall. Due to the virtual machine monitor 200, an application program may only affect one of the domains 400 where the execution of the application program takes place.

Once an OS is divided into the root domain 300 and the domains 400 by the virtual machine monitor 200, the system-resource-control module 250 of the virtual machine monitor 200 may allocate system resources to each of the domains 400 according to the trust levels of the domains 400 (S502).

Specifically, the system-resource-control module 250 may set a trust level-based system resource allocation policy and allocate system resource to each of the domains 400 according to the policy.

For example, since the root domain 300 has a highest trust level and ring 0, the system-resource-control module 250 may allocate a largest amount of system resource to the root domain 300. The system-resource-control module 250 may allocate system resource to the first through N-th domains 410 through 450 having ring 0 through ring N, respectively, according to the trust levels of the first through N-th domains 410 through 450. In an exemplary embodiment, the trust level of the first domain 410 is highest among the trust levels of the domains 400, the trust level of the N-th domain 450 is lowest among the trust level of the domains 400, and the trust level of an arbitrary domain between the first domain 410 and the N-th domain 450 is lower than the trust level of a domain previous to the arbitrary domain and higher than the trust level of a domain subsequent to the arbitrary domain. System resource information regarding the allocation of system resource may be stored in the system-resource-information storage module 260.

The virtual machine monitor 200 divides an OS into a plurality of domains and installs an application program in one of the domains that is compatible with the trust level of the application program. Thus, even if an application program is mistakenly determined to be legitimate, it is possible to improve the stability of a system because the application program can only affect the domain in which the application program is installed. In contrast, even if an application program is mistakenly determined to be malware, it is possible to improve the precision of malware detection by executing the application program in a domain having a low trust level, instead of indiscriminately blocking the execution of the application program.

Figure 4:
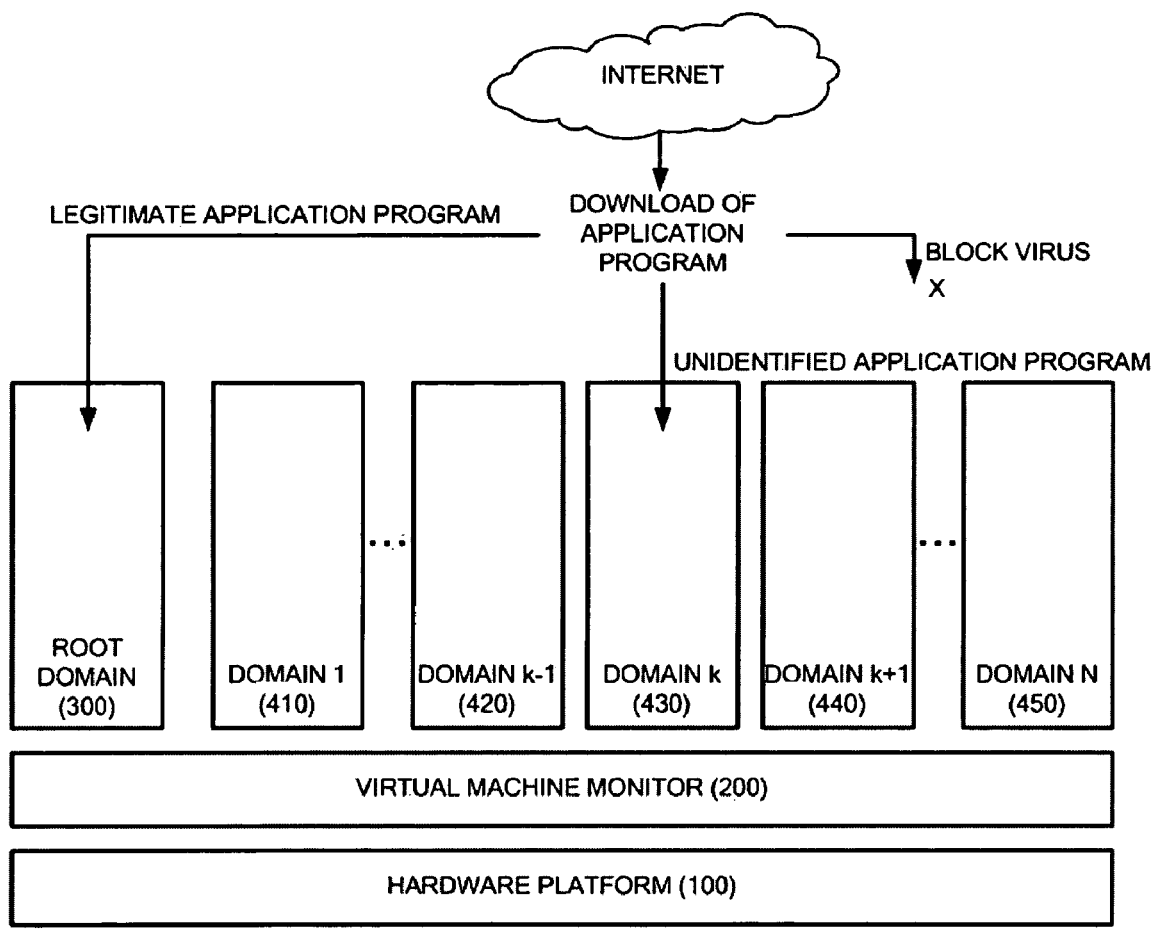
FIG. 4 illustrates a block diagram for explaining the download and installation of a downloaded application program in the system illustrated in FIG. 1.

FIG. 4 illustrates a block diagram for explaining the download and installation of a downloaded application program in the system illustrated in FIG. 1. Referring to FIG. 4, it may be determined whether an application program is legitimate before downloading the application program from, for example, the Internet, by using a security program or an IDS, which is installed in the system, or using a network intrusion detection system (NIDS), which is installed in an external device.

If the application program is determined to be legitimate, the application program may be readily installed in the root domain 300. In contrast, if the application program is identified as malicious software or malware such as a virus program, the installation of the application program in the system may be blocked. If the application program is determined to be an unidentified application program, the application program may be downloaded into one of the domains 400 having a predefined trust level, for example, a k-th domain 430 having ring k. It may be determined into which of the domains 400 the application program is to be downloaded according to a system policy. Once the download of the application program is complete, the application program may be executed in the k-th domain 430. However, the download and installation of an application program in the system is not restricted to that set forth herein.

Referring to FIG. 2, once an application program is installed and executed in the k-th domain 430, the trust-management module 340 of the root domain 300 may periodically measure the trust level of the application program (S503). Then, the trust-management module 340 may adjust the trust level of the application program based on the result of the measurement. That is, if the application program does not show any abnormality, the trust-management module 340 may promote the trust level of the application program. In contrast, if the application program appears abnormal, the trust-management module 340 may demote the trust level of the application program.

Specifically, the trust level of an application program may be measured based on the result of analysis performed by the behavior-pattern-profiler module 220 of the virtual machine monitor 200, i.e., the pattern of runtime behavior of the application program. That is, the trust level of an application may be measured by monitoring system calls during the execution of the application program, analyzing the pattern of access to system resource and determining whether the application program is malware based on the result of the analysis. If the result of the measurement of the trust level of an application program indicates that the application program is legitimate software, the trust-management module 340 may promote the trust level of the application program. In contrast, if the result of the measurement of the trust level of the application program indicates that the application program is malware, the trust-management module 340 may demote the trust level of the application program.

The degree to which the trust level of an application program is promoted or demoted may be determined based on the result of determination performed by the coverage-monitoring module 230 of the virtual machine monitor 200, i.e., the coverage of binary code of the application program. That is, if the coverage of the binary code of the application program is high, the trust-management module 340 may increase the degree to which the trust level of the application program is promoted. In contrast, if the coverage of the binary code of the application program is low, the trust-management module 340 may reduce the degree to which the trust level of the application program is promoted.

In addition, the degree to which the trust level of an application program is promoted or demoted may be determined based on the duration of the execution of the application program. That is, the longer the duration of the execution of an application program, the more precise the result of the measurement of the trust level of the application program. Therefore, if the duration of the execution of an application program is long, the trust-management module 340 may increase the degree to which the trust level of the application program is promoted.

As described above, if the trust level of an application program has not changed since the measurement of the trust level of the application program, the trust-management module 340 may migrate the application program to one of the domains 400 that is compatible with the trust level of the application program. Specifically, the trust-management module 340 may determine in which of the domains 400 the application program is currently being executed, and determine which of the domains 400 is compatible with the trust level of the application program (S504). Thereafter, the trust-management module 340 may request the process-migration-control module 240 of the virtual machine monitor 200 to migrate the application program (S505).

Figure 5:
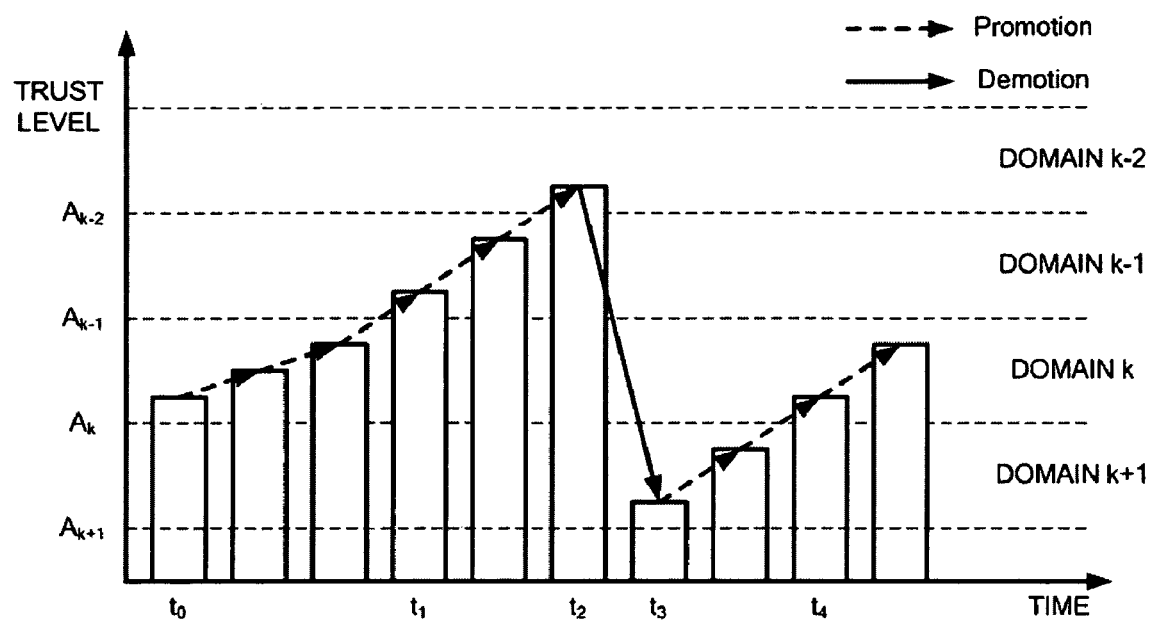
FIG. 5 illustrates a graph for explaining the periodic measurement and adjustment of the trust level of an application program by the trust-management module illustrated in FIG. 1.

FIG. 5 illustrates a graph for explaining the periodic measurement and the adjustment of the trust level of an application program by the trust-management module 340. Referring to FIG. 5, a downloaded application program may be executed in the k-th domain 430 at a time t0. Thereafter, the trust-management module 340 measures the trust level of the downloaded application program. As described above, the trust-management module 340 may periodically measure the trust level of the downloaded application program by analyzing the pattern of runtime behavior of the downloaded application program. If no abnormal change in the trust level of the downloaded application program is detected, the trust-management module 340 may promote the trust level of the downloaded application program.

Thereafter, if the result of the measurement of the trust level of the downloaded application program, for example, at a time t1, exceeds a maximum trust level Ak−1 of the k-th domain 430, the trust-management module 340 may request the process-migration-control module 240 of the virtual machine monitor 200 to migrate the downloaded application program to a (k−1)-th domain 420. Thereafter, if the result of the measurement of the trust level of the downloaded application program, for example, at a time t2, exceeds a maximum trust level Ak−2 of the (k−1)-th domain 420, the trust-management module 340 may request the process-migration-control module 240 of the virtual machine monitor 200 to migrate the downloaded application program to a (k−2)-th domain.

If the result of the measurement of the trust level of the downloaded application program, for example, at a time t1, indicates that the downloaded application program shows abnormality, the trust-management module 340 may demote the trust level of the downloaded application program. For example, if the trust level of the downloaded application program decreases below the minimum trust level Ak of the k-th domain 430, the trust-management module 340 may request the process-migration-control module 240 of the virtual machine monitor 200 to migrate the downloaded application program to a (k+1)-th domain 440.

Referring to FIG. 2, if a request for the migration of an application program is issued to the process-migration control module 240 (S505), the process-migration control module 240 may migrate a process of the application program to one of the domains 400 that is compatible with the trust level of the application program (S506).

Figure 6:
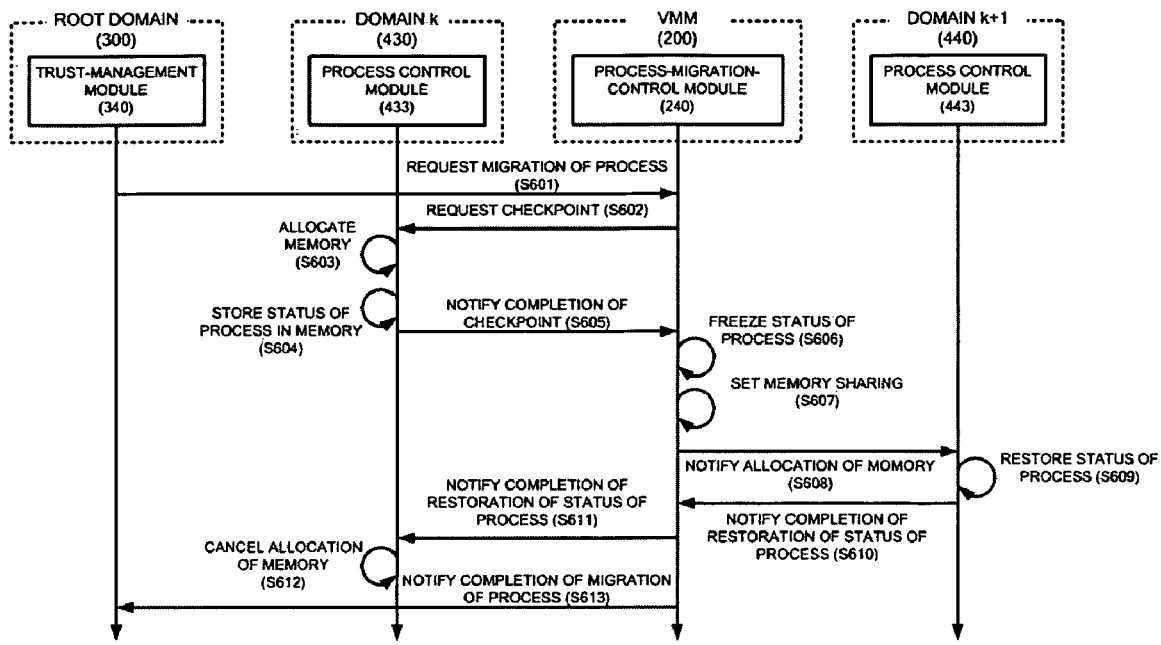
FIG. 6 illustrates a flowchart of the migration of a process of an application program according to the trust level of the application program by the trust-management module illustrated in FIG. 1.

FIG. 6 illustrates a flowchart of the migration of a process of an application program according to the trust level of the application program. Referring to FIG. 6, in order to migrate a process of an application program from the k-th domain 430 to the (k+1)-th domain 440 according to the result of the adjustment of the trust level of the application program, the trust-management module 340 of the root domain 300 requests the process-migration-control module 240 of the virtual machine monitor 200 to migrate the process of the application program (S601).

Then, the process-migration-control module 240 may issue a checkpoint request for the status of the process of the application program to the process control module of the k-th domain 430 (S602).

A checkpoint is a process of inspecting and recording the status of execution of a program so that the execution of the program can be resumed at any time after being terminated. In an exemplary embodiment, a checkpoint may be interpreted as storing the status of a process of an application program for migrating the process of the application program.

The process control module of the k-th domain 430 allocates a memory object for storing the status of the process of the application program (S603), and stores the status of the process of the application program in the memory object (S604). Thereafter, the process control module of the k-th domain 430 may notify the process-migration-control module 240 of the completion of a checkpoint (S605). The process-migration-control module 240 may freeze the status of the process of the application program (S606) so that the status of the process of the application program can be prevented from being modified during the migration of the process of the application program. For example, the process-migration-control module 240 may freeze the status of the process of the application program by setting the memory object in which the status of the process of the application program is stored to a read-only mode. Thereafter, the process-migration-control module 240 sets all the domains 400 to share a memory (S607) and notifies the (k+1)-th domain 440 (S608). The (k+1)-th domain 440 restores the status of the process of the application program from the memory (S609), and notifies the process-migration-control module 240 that the restoration of the status of the process of the application program is complete (S610). The process-migration-control module 240 notifies the k-th domain 430 that the restoration of the status of the process of the application program is complete (S611). The k-th domain 430 cancels the allocation of the memory object (S612). The process-migration-control module 240 notifies the trust-management module 340 that the migration of the process of the application program is complete (S613).

The process-migration-control module 240 may classify the status of a process of an application program into a volatile status or a nonvolatile status and migrate the process of the application program if the status of the process of the application program is a volatile status. A process of an application program having a volatile status may be able to be migrated from one domain to another domain according to the trust level of the application program. Examples of a volatile status include a CPU register status, a memory status (such as data, stack and heap), an inter-process communication (IPC) channel status, a network connection status, and an I/O device status. A process of an application program having a nonvolatile status is a process being serviced by the root domain 300, and is thus unable to be migrated from one domain to another domain within the domains 400 regardless of the trust level of the application program. Examples of a process having a nonvolatile status include data or files that are generated or referenced by binary code or an application program.

Referring to FIG. 2, when an application program is executed in a domain that is compatible with the trust level of the application program (S507), the system-resource-control module 250 of the virtual machine monitor 200 may control the access of the application program to system resources according to the trust level of the application program (S508).

As described above, according to the present invention, it is possible to precisely determine whether an application program is malware by periodically monitoring the trust level of the application program. In addition, according to the present invention, it is possible to improve the stability of a system by dividing an OS into a plurality of domains with the aid of a virtual machine monitor, and execute an application program in whichever of the domains is compatible with the trust level of the application program. Moreover, according to the present invention, it is possible to improve the efficiency of use of system resources by allocating system resource to domains according to the trust levels of the domains The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While the present invention has been particularly shown and described with reference to exemplary embodiments thereof, it will be understood by those of ordinary skill in the art that various changes may be made in the form and details without departing from the spirit and scope of the present invention as defined by the following claims.

What is claimed is:

1. A system for executing a program, the system comprising:
    a virtual machine monitor which divides an operating system (OS) into at least one root domain and a plurality of domains having different trust levels;
    a trust-management module which is included in the at least one root domain and which periodically measures and adjusts a trust level of an application program currently being executed in the plurality of domains; and
    a memory unit storing a component and a processor,
    wherein the virtual machine monitor executes the application program in one of the plurality of domains in consideration of the measured trust level of the application program,
    wherein the virtual machine monitor comprises a process-migration-control module that migrates a process of the application program to whichever domain of the plurality of domains is compatible with the trust level of the application program, and
    the process-migration-control module first freezes a status of the process of the application program, then provides the process of the application program to the domain of the plurality of domains that is compatible with the trust level of the application program, and finally restores the status of the process of the application program.

2. The system of claim 1, wherein the virtual machine monitor comprises a system-resource-control module which allocates system resources to each of the plurality of domains according to the trust levels of the domains.

3. The system of claim 2, wherein the virtual machine monitor further comprises a system-resource-information storage module which stores system resource information regarding system resources allocated to each of the plurality of domains.

4. The system of claim 2, wherein the system-resource-control module controls an access of the application program to system resources according to the trust level of the application program.

5. The system of claim 1, wherein the virtual machine monitor comprises a behavior-profiler module which analyzes a pattern of runtime behavior of the application program.

6. The system of claim 5, wherein the virtual machine monitor further comprises a coverage-monitoring module which determines a coverage of binary code of the application program.

7. The system of claim 1, wherein the trust-management module determines in which domain of the plurality of domains the application program is currently being executed and determines which domain of the plurality of domains is compatible with the trust level of the application program.

8. The system of claim 1, wherein the process-migration control module classifies a status of the process of the application program as a volatile status or a nonvolatile status and migrates the process of the application program if the status of the process of the application program is the nonvolatile status.

9. A method of controlling a system for executing a program, the method comprising:
    dividing an operating system (OS) into at least one root domain and a plurality of domains having different trust levels, by using a virtual machine monitor;
    enabling the at least one root domain to periodically measures and adjusts a trust level of an application program currently being executed in the plurality of domains; and executing the application program in one of the plurality of domains, according to the trust level of the application program, wherein the executing of the application program comprises determining in which domain of the plurality of domains the application program is currently being executed, determining which domain of the plurality of domains is compatible with the trust level of the application program, and migrating a process of the application program to the domain of the plurality of domains that is compatible with the trust level of the application program, and the migrating of the process of the application program comprises first storing a status of the process of the application program, then enabling the virtual machine monitor to freeze the status of the process of the application program, and finally restoring the status of the process of the application program in the domain of the plurality of domains that is compatible with the trust level of the application program.

10. The method of claim 9, wherein the dividing of the OS comprises allocating system resources to each of the plurality of domains according to the trust levels of the domains.

11. The method of claim 10, wherein the dividing of the OS further comprises storing system resource information regarding system resources allocated to each of the plurality of domains.

12. The method of claim 9, wherein the periodic measuring of the trust level of the application program comprises analyzing a pattern of runtime behavior of the application program.

13. The method of claim 12, wherein the periodic measuring of the trust level of the application program further comprises determining a coverage of binary code of the application program.

14. The method of claim 9, wherein the migrating of the process of the application program comprises classifying a status of the process of the application program as a volatile status or a nonvolatile status and migrating the process of the application program if the status of the process of the application program is the nonvolatile status.

15. The method of claim 9, wherein the executing of the application program comprises controlling an access of the application program to system resources according to the trust level of the application program.

* * * * *